(12) United States Patent
Ogawa et al.

(10) Patent No.: US 11,485,619 B2
(45) Date of Patent: Nov. 1, 2022

(54) AUTOMATIC GUIDED VEHICLE

(71) Applicant: Kabushiki Kaisha Toshiba, Minato-ku (JP)

(72) Inventors: Hideki Ogawa, Shinagawa (JP); Daisuke Yamamoto, Kawasaki (JP); Takafumi Sonoura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 286 days.

(21) Appl. No.: 16/795,685

(22) Filed: Feb. 20, 2020

(65) Prior Publication Data
US 2021/0061629 A1    Mar. 4, 2021

(30) Foreign Application Priority Data

Aug. 30, 2019   (JP) ............................. JP2019-158299

(51) Int. Cl.
*B66F 9/06*      (2006.01)
*B66F 9/075*     (2006.01)
(Continued)

(52) U.S. Cl.
CPC ............ *B66F 9/063* (2013.01); *B60W 30/08* (2013.01); *B66F 9/0755* (2013.01); *G05D 1/0055* (2013.01); *B60W 2030/082* (2013.01); *B60W 2300/121* (2013.01); *B60W 2422/90* (2013.01); *G05D 2201/0216* (2013.01)

(58) Field of Classification Search
CPC .......... B66F 9/063; B66F 9/0755; B66F 9/24; B60W 30/08; B60W 2030/082; B60W 2300/121; B60W 2422/90; G05D 1/0055; G05D 2201/0216; G05D 1/0227; B60R 19/38; B60R 2019/026
See application file for complete search history.

(56) References Cited

U.S. PATENT DOCUMENTS 3,965,657 A * 6/1976 Jespersen ........... A01D 34/6806
                                                56/10.2 R
5,036,935 A * 8/1991 Kohara ................ G05D 1/0265
                                                180/168
(Continued)

FOREIGN PATENT DOCUMENTS

JP    08-156717 A    6/1996
JP    2003-002190 A  1/2003

OTHER PUBLICATIONS

Automotive Airbag Sensors, Jul. 27, 2012, azosensors.com (Year: 2012).*

*Primary Examiner* — Tyler J Lee
*Assistant Examiner* — Yufeng Zhang
(74) *Attorney, Agent, or Firm* — Oblon, McClelland, Maier & Neustadt, L.L.P.

(57) ABSTRACT

In embodiments, an automatic guided vehicle includes a vehicle, a lift unit, a bumper, an extension detector, and a bumper controller. The vehicle is movable in at least a first direction. The lift unit is provided in the vehicle and lifts an object from below the object. The bumper is provided in the vehicle and is extendable and contractible in the first direction. The extension detector detects that the bumper has extended outward from the object in the first direction. The bumper controller controls a state of the bumper according to a conveyance state of the object by the vehicle.

19 Claims, 10 Drawing Sheets

(51) Int. Cl.
B60W 30/08 (2012.01)
G05D 1/00 (2006.01)

(56) References Cited

U.S. PATENT DOCUMENTS

| | | | |
|---|---|---|---|
| 2005/0110284 A1* | 5/2005 | Browne | B60R 19/40 |
| | | | 293/118 |
| 2016/0167557 A1* | 6/2016 | Mecklinger | B66F 9/065 |
| | | | 414/495 |

* cited by examiner

AUTOMATIC GUIDED VEHICLE

CROSS-REFERENCE TO RELATED APPLICATIONS

This application is based upon and claims the benefit of priority from Japanese Patent Application No. 2019-158299, filed on Aug. 30, 2019; the entire contents of which are incorporated herein by reference.

FIELD

Embodiments described herein relate to an automatic guided vehicle.

BACKGROUND

In the field of logistics, there is a demand for labor saving to save labor and costs. For example, as a method of automating conveyance of an object such as a roll box pallet, a method of conveying an object by an automatic guided vehicle has been proposed. In such an automatic guided vehicle, further improvement in safety performance during conveyance and performance of protecting an object are desired.

DETAILED DESCRIPTION

In embodiments, an automatic guided vehicle includes a vehicle, a lift unit, a bumper, an extension detector, and a bumper controller. The vehicle is movable in at least a first direction. The lift unit is provided in the vehicle and lifts an object from below the object. The bumper is provided in the vehicle and is extendable and contractible in the first direction. The extension detector detects that the bumper has extended outward from the object in the first direction. The bumper controller controls a state of the bumper according to a conveyance state of the object by the vehicle.

Hereinafter, an automatic guided vehicle of an embodiment will be described with reference to the drawings.

In the present application, an X direction, a Y direction, and a Z direction are defined as follows. The Z direction is a vertical direction and a +Z direction is vertically upward. The X direction is a horizontal direction and a +X direction is a conveyance direction of an object. The Y direction is a horizontal direction and is a direction perpendicular to the X direction. In the following embodiments, a case in which a cart on which a load is loaded is an object will be described as an example.

First Embodiment

Figure 1:
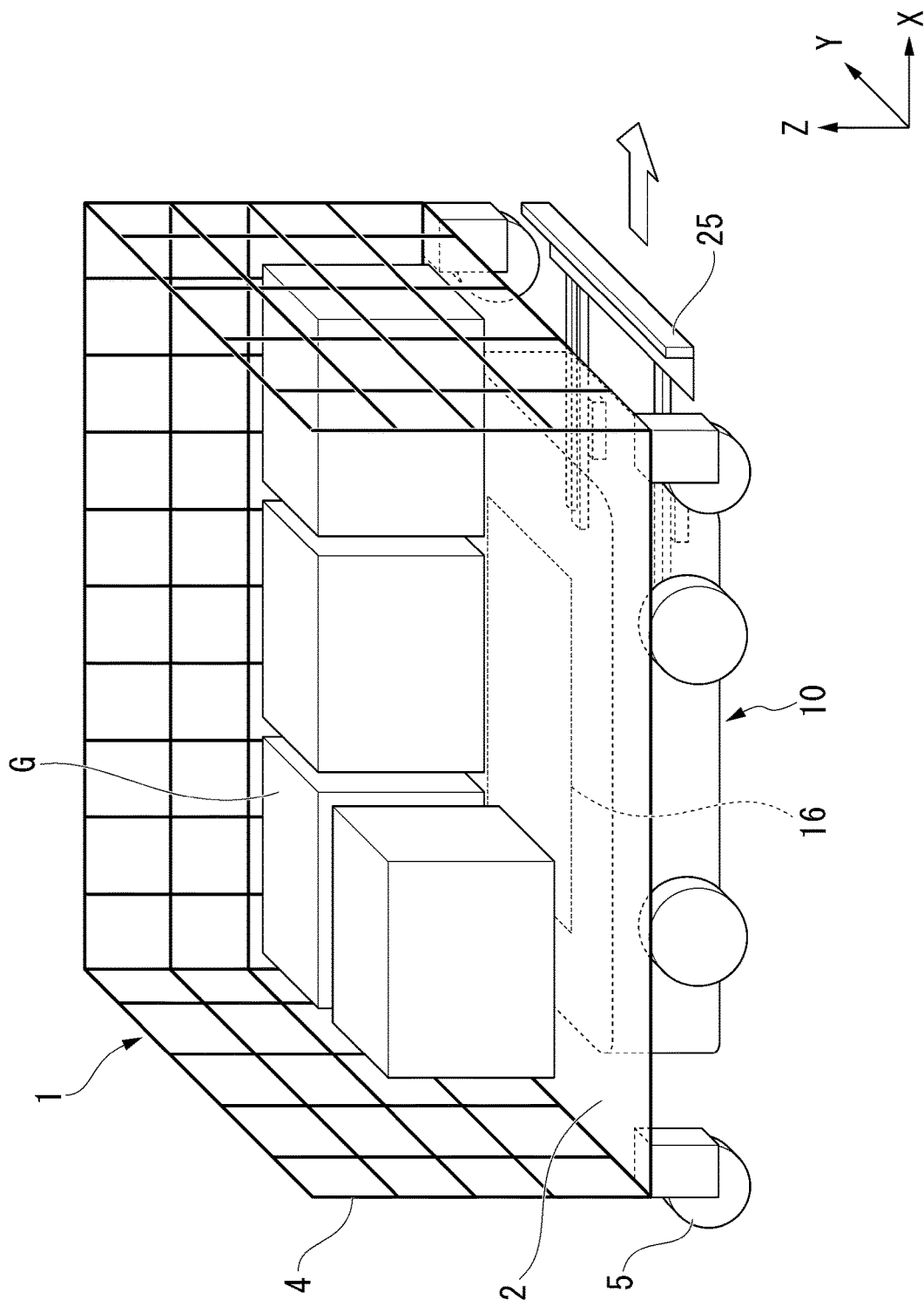
FIG. 1 is a perspective view of an object and an automatic guided vehicle.

FIG. 1 is a perspective view of a cart and an automatic guided vehicle. A cart 1 is a basket cart such as a roll box pallet (RBP). The cart 1 includes a bottom plate 2, a frame body 4, and a caster 5.

The bottom plate 2 is formed in a rectangular shape when viewed from the +Z direction. The bottom plate 2 is formed of a metal material such as aluminum, a resin material, or the like.

The frame body 4 is formed by combining rods into a lattice shape. The frame body 4 is erected in the +Z direction from edge sides on an upper surface of the bottom plate 2. A load G can be loaded inside the frame body 4.

The caster 5 is rotatable around a Z axis. A plurality of casters 5 are disposed at four corners of a lower surface of the bottom plate 2.

An automatic guided vehicle 10 conveys the cart 1 to a destination. The automatic guided vehicle 10 moves along a floor surface and enters between the bottom plate 2 of the cart 1 and the floor surface. The automatic guided vehicle 10 can lift the cart 1 from below the cart 1. The automatic guided vehicle 10 is movable at least in the +X direction with the cart 1 lifted.

Figure 2:
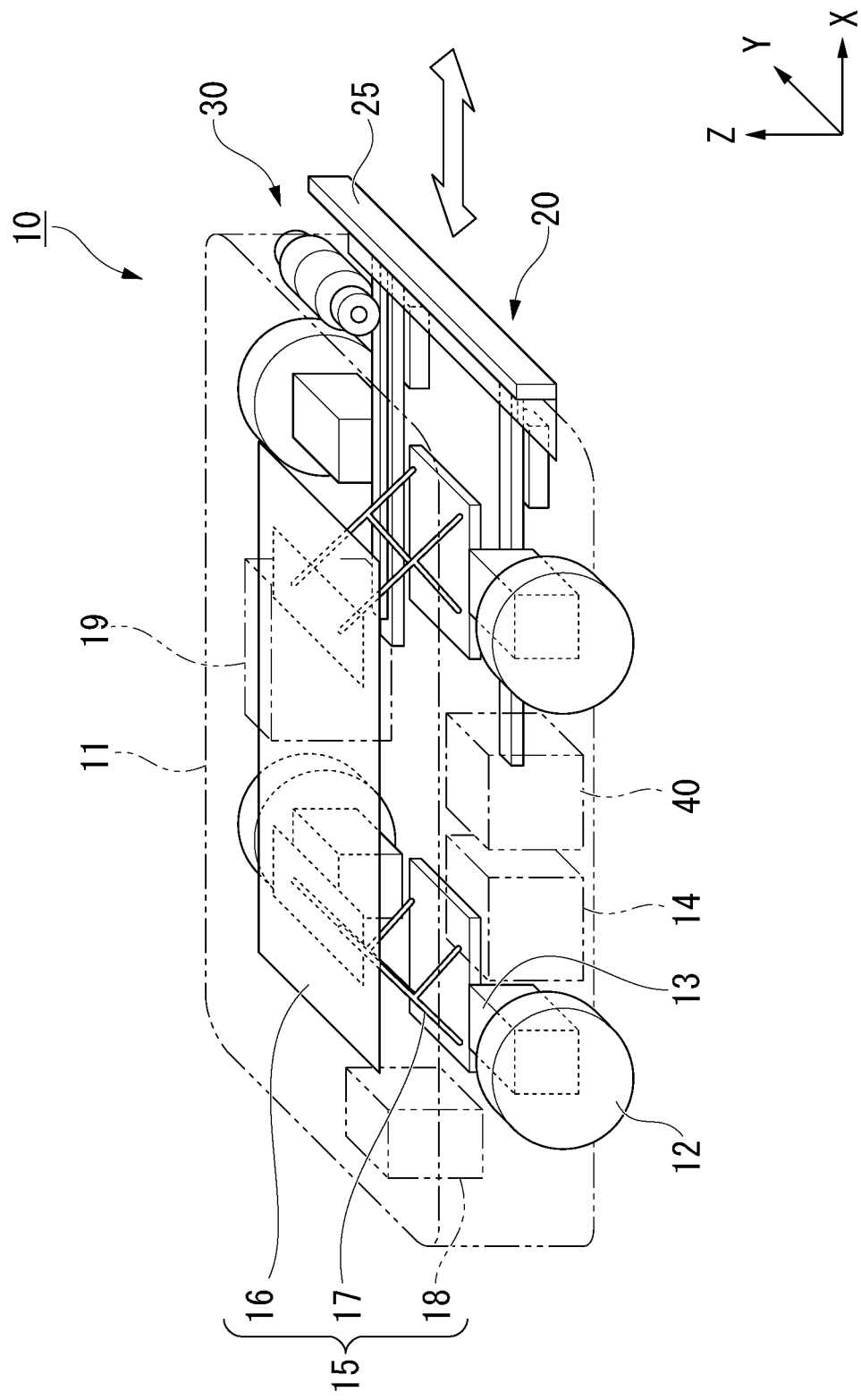
FIG. 2 is a perspective view of an automatic guided vehicle of a first embodiment.

FIG. 2 is a perspective view of an automatic guided vehicle of a first embodiment. The automatic guided vehicle 10 may be, for example, an autonomous mobile vehicle in which operation by an operator is unnecessary and be an autonomous mobile vehicle of a line-less type in which lines drawn on a floor surface or the like also are unnecessary. The automatic guided vehicle 10 may be, for example, a low-floor type automatic guided vehicle (AGV) and may slip below the cart 1 to be coupled to the cart 1, and convey the cart 1. However, the automatic guided vehicle 10 is not limited to the above examples and may be another type of automatic guided vehicle. For example, the automatic guided vehicle 10 may be one operated by an operator.

The automatic guided vehicle 10 includes a vehicle 11 and a battery 19. The vehicle (vehicle main body) 11 may be formed in, for example, a rectangular parallelepiped shape. The battery 19 is disposed inside the vehicle 11. The battery 19 supplies power to each part of the automatic guided vehicle 10.

The automatic guided vehicle 10 includes a moving unit, a lift unit 15, and a bumper unit.

The moving unit moves the vehicle 11 at least in the X direction. The moving unit includes a plurality of wheels 12, a drive motor 13, and a movement controller 14.

The plurality of wheels 12 may be, for example, four wheels 12 and be disposed in the vicinity of four corners of the vehicle 11. The drive motor 13 rotationally drives the wheels 12. The movement controller 14 controls a rotation direction and a rotation speed of the wheels 12 by controlling an operation of the drive motor 13. Thereby, the movement controller 14 controls a movement direction and a movement speed of the automatic guided vehicle 10.

The lift unit 15 lifts the cart 1 from below the cart 1. The lift unit 15 includes a lifting plate 16, a lifting mechanism 17, and a lift controller 18.

The lifting plate 16 is formed in a flat plate shape and is disposed in the +Z direction of the vehicle 11. The lifting mechanism 17 is disposed below the lifting plate 16. The lifting mechanism 17 includes a power source (not illustrated) such as a motor or an actuator, and a link mechanism. The power source extends and contracts the link mechanism in the Z direction. Thereby, the lifting plate 16 connected to the link mechanism is raised and lowered in the Z direction. When the lifting plate 16 is raised and in contact with the bottom plate 2 of the cart 1, at least a part of a weight of the cart 1 is supported by the lifting mechanism 17. A load cell (not illustrated) installed in the lifting mechanism 17 detects the weight of the cart 1 supported by the lifting mechanism 17 and outputs it to the lift controller 18. The lift controller 18 controls a lifting operation of the lifting plate 16 by controlling an operation of the power source. Thereby, the lift controller 18 controls a lift state of the cart 1 (a support state of the weight of the cart 1) by the lifting mechanism 17.

The bumper unit extends and contracts a bumper 25 to protect the cart 1. The bumper unit includes the bumper 25, a bumper extension/contraction mechanism 20, a bumper extension/contraction driver 30, and a bumper controller 40.

The bumper 25 is formed of a resin material, a metal material, or the like. The bumper 25 has a longitudinal direction in the Y direction. A length of the bumper 25 is equal to or greater than a width of the vehicle 11 in the Y direction. The bumper 25 is disposed along an edge side in the −Z direction on a surface in the +X direction of the vehicle 11.

Figure 3:
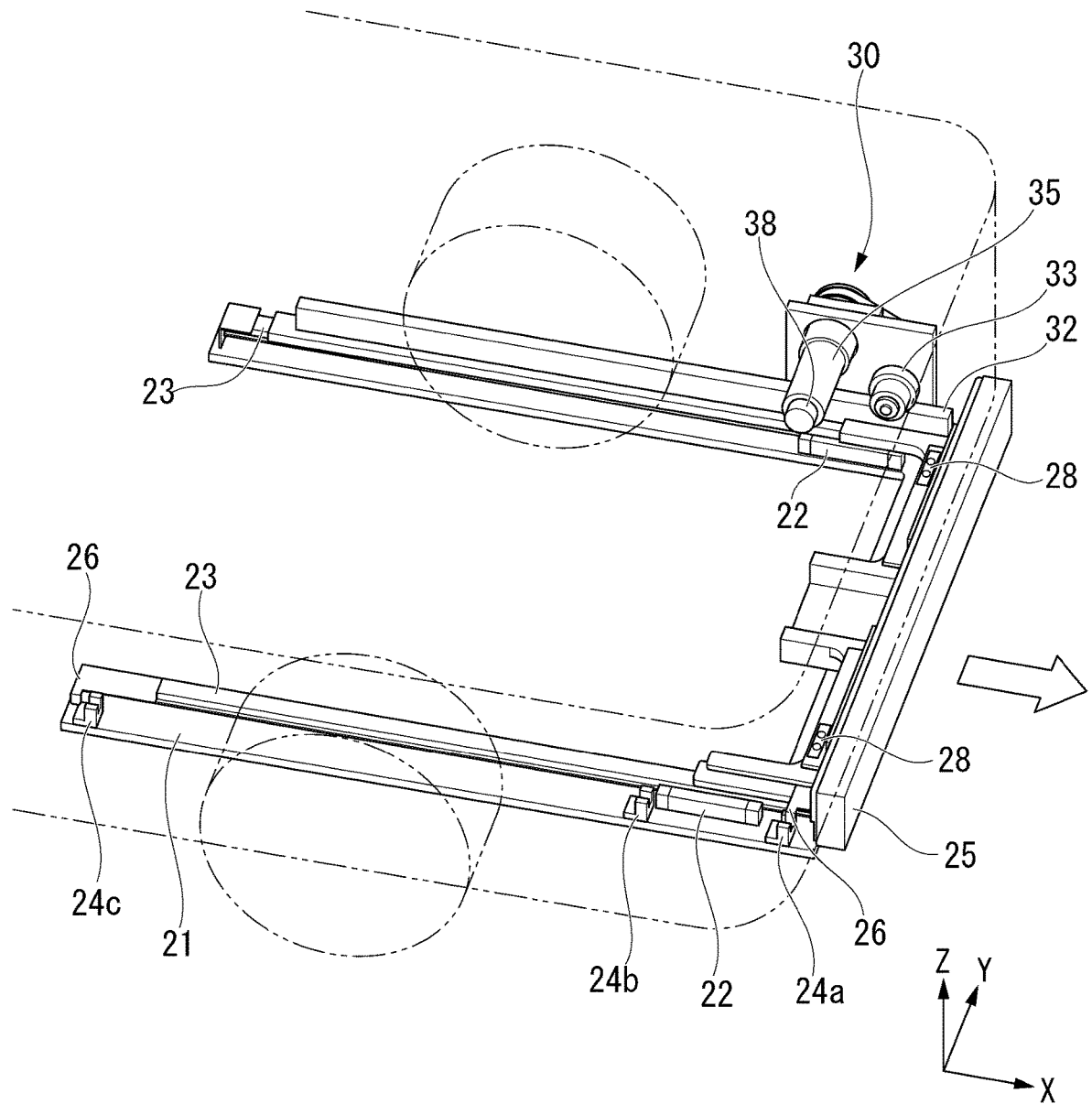
FIG. 3 is a perspective view of a bumper extension/contraction mechanism.

FIG. 3 is a perspective view of the bumper extension/contraction mechanism. The bumper extension/contraction mechanism 20 allows the bumper 25 to be in an extendable and contractible state. The bumper extension/contraction mechanism 20 includes a guide rail 23 and a guide block 22.

The guide rail 23 extends in the X direction. An end portion in the +X direction of the guide rail 23 is fixed to the bumper 25. A pair of guide rails 23 are disposed to be spaced apart from each other in the Y direction. The guide block (slider) 22 is disposed in the −Z direction of the guide rail 23. The guide block 22 is fixed to a bottom surface of the vehicle 11 via a base plate 21. The guide block 22 is disposed at an end portion in the +X direction of the vehicle 11.

The guide rail 23 and the guide block 22 are constituent members of a linear guide and are slidable relative to each other. The bumper 25 connected to the guide rail 23 is movable in the X direction with respect to the vehicle 11 to which the guide block 22 is fixed. That is, the bumper 25 is extendable and contractible in the X direction with respect to the vehicle 11.

Figure 4:
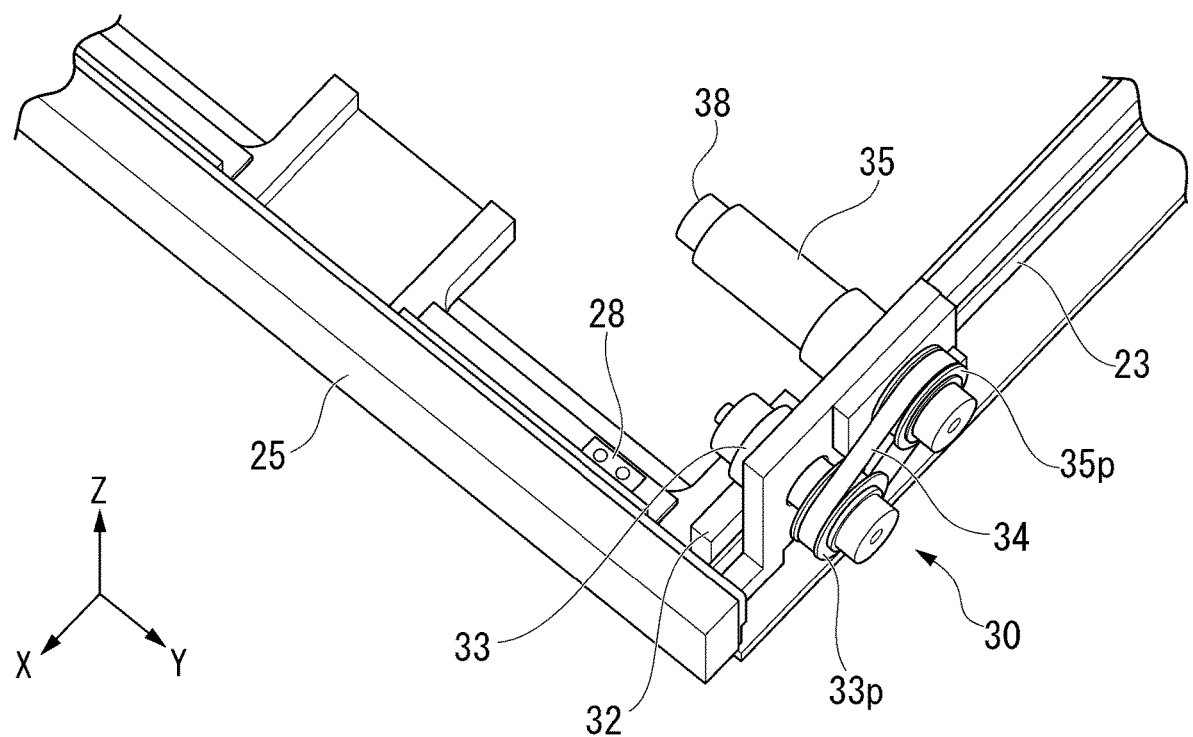
FIG. 4 is a perspective view of a bumper extension/contraction driver.

FIG. 4 is a perspective view of the bumper extension/contraction driver. The bumper extension/contraction driver 30 extends and contracts the bumper 25 in the X direction. The bumper extension/contraction driver 30 is disposed in the vicinity of one of the pair of guide rails 23 in the +Y direction or the −Y direction. The bumper extension/contraction driver 30 includes a rack gear 32 and a pinion gear 33, and an actuator 35.

The rack gear 32 extends in the X direction. The rack gear 32 is fixed to a surface in the +Z direction of the guide rail 23 in the +Y direction. The pinion gear 33 is disposed in the +Z direction of the rack gear 32 and meshes with the rack gear 32. A pinion pulley 33p is coaxially connected to the pinion gear 33. The actuator (motor) 35 is disposed side by side with the pinion gear 33 in the X direction. An actuator pulley 35p is coaxially connected to the actuator 35. A timing belt 34 is stretched between the pinion pulley 33p and the actuator pulley 35p. When the actuator 35 rotates, the pinion gear 33 rotates via the timing belt 34, and the rack gear 32 moves in the X direction. Thereby, the bumper 25 extends and contracts in the X direction.

In order to control an operation of the bumper 25, as illustrated in FIG. 3, the bumper unit includes an encoder 38, limit switches 24 (24a, 24b, and 24c), an extension detect sensor 28, and the bumper controller 40 (see FIG. 2).

The encoder 38 is connected to the actuator 35. The encoder 38 outputs a pulse corresponding to a rotation angle of the actuator 35 per unit time to the bumper controller 40. The bumper controller 40 controls a position of the bumper 25 on the basis of the pulse received from the encoder 38.

The limit switches 24 regulate a movement limit of the bumper 25 in the X direction. The limit switch 24 may be, for example, a photoelectric switch. The limit switch 24 detects a sensor dog 26 attached to the guide rail 23 and outputs a detection signal to the bumper controller 40 to be described below. The bumper controller 40 stops the actuator 35 when it receives the detection signal from the limit switches 24a and 24b. The limit switches 24 include the first switch 24a, the second switch 24b, and the third switch 24c (in which 24c is an original position detection switch). The first switch 24a is disposed at an end portion in the +X direction of the vehicle 11. The first switch 24a regulates a movement limit of the bumper 25 in the −X direction. The second switch 24b is disposed close to the guide block 22 in the −X direction. The second switch 24b regulates a movement limit of the bumper 25 in the +X direction.

The extension detect sensor 28 detects that the bumper 25 has extended outward from the cart 1. The extension detect sensor 28 may be, for example, a photoelectric sensor. The extension detect sensor 28 is disposed close to the bumper 25 in the −X direction. The extension detect sensor 28 includes a light emitting unit and a light receiving unit which are disposed to face in the +Z direction. A pair of extension detect sensors 28 are disposed to be spaced apart from each other in the Y direction.

Figure 5:
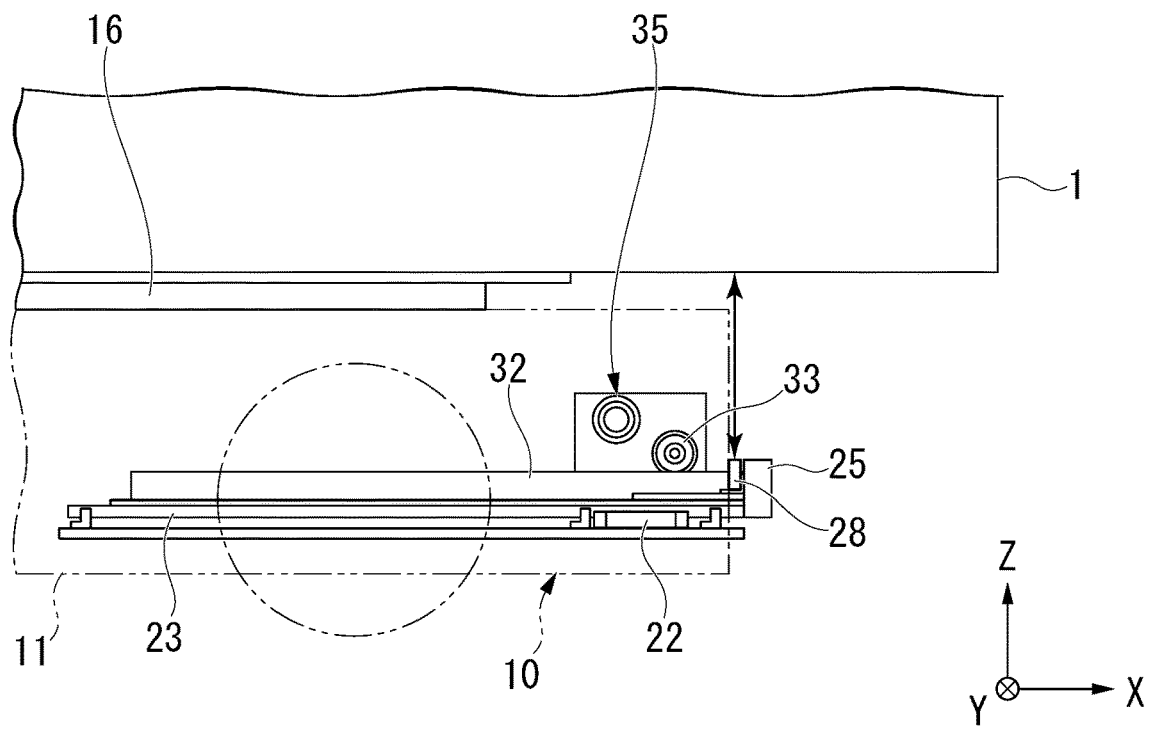
FIG. 5 is a side view of a bumper in a contracted state.

FIG. 5 is a side view of the bumper in a contracted state. In the contracted state of the bumper 25, the bumper 25 is disposed close to the vehicle 11 in the +X direction. At this time, the cart 1 is present in the +Z direction from the extension detect sensor 28. In this case, light emitted in the +Z direction from the light emitting unit of the extension detect sensor 28 is reflected by the cart 1 and then is incident on the light receiving unit.

Figure 6:
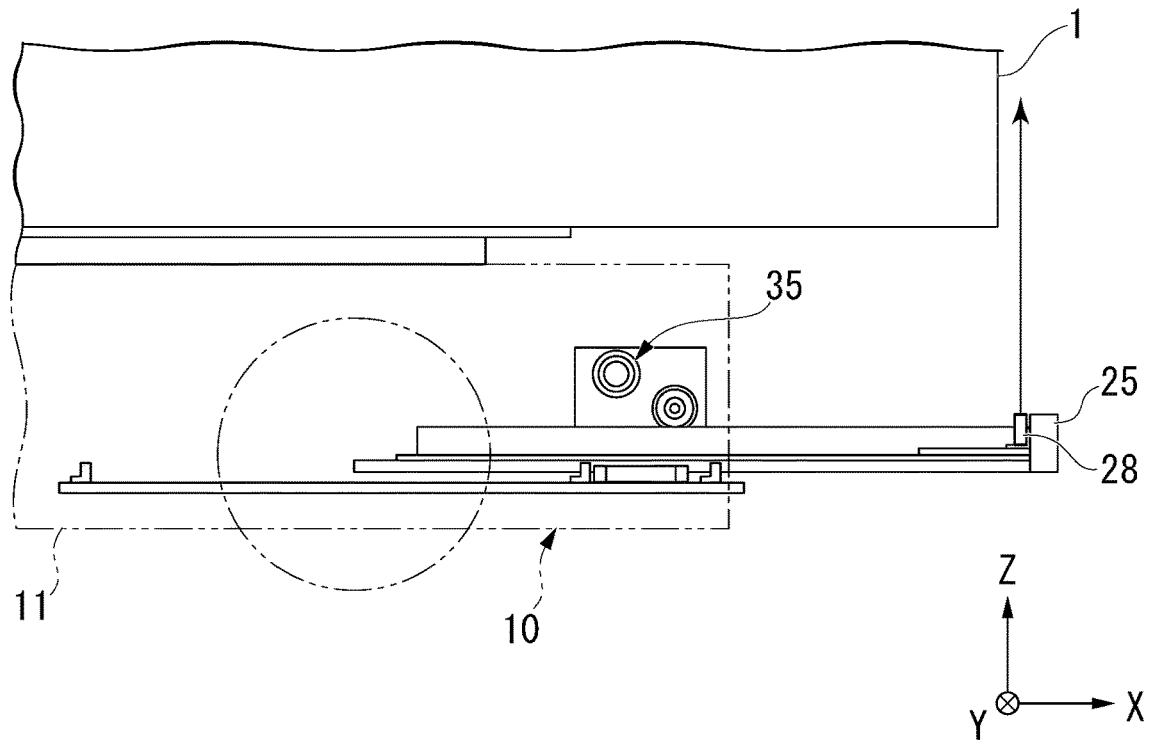
FIG. 6 is a side view of the bumper in an extended state.

FIG. 6 is a side view of the bumper in an extended state. When the bumper 25 extends in the +X direction, the bumper 25 protrudes outward from an end portion in the +X direction of the cart 1. At this time, the cart 1 is not present in the +Z direction of the extension detect sensor 28. Light emitted in the +Z direction from the light emitting unit of the extension detect sensor 28 is not reflected by the cart 1 and therefore is not incident on the light receiving unit. In this case, the extension detect sensor 28 outputs an extension detection signal to the bumper controller 40 to be described below. The bumper controller 40 stops the actuator 35 when it has received the extension detection signal from the extension detect sensor 28. The bumper controller 40 may stop the actuator 35 when it has received the extension detection signal from both the pair of extension detect sensors 28. As described above, an extension of the bumper 25 is stopped in a state in which the bumper 25 has extended outward from the cart 1.

Thereby, even when an amount of protrusion of the cart 1 with respect to the vehicle 11 is unknown, it is possible to dispose the bumper 25 in the +X direction from the cart 1. In addition, even when there is an error in an approach position of the automatic guided vehicle 10 with respect to the cart 1 while an amount of protrusion is known, it is possible to dispose the bumper 25 in the +X direction from the cart 1.

Figure 7:
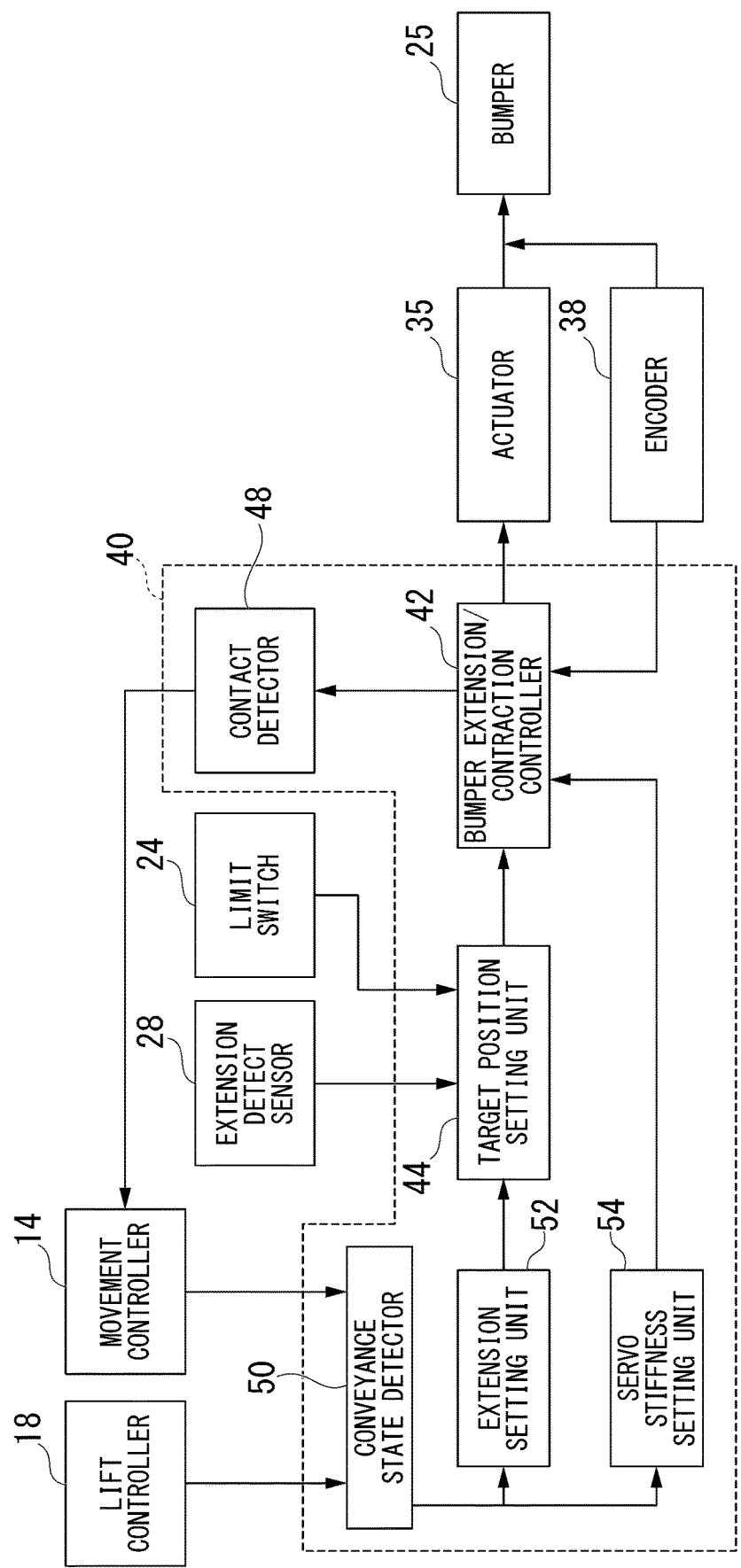
FIG. 7 is a block diagram around a bumper controller.

FIG. 7 is a block diagram around the bumper controller. The bumper controller 40 controls a state of the bumper 25. The bumper controller 40 includes a target position setting unit 44, a bumper extension/contraction controller 42, and a contact detector 48.

Functional units of the bumper controller 40 are each realized, for example, when at least a part thereof causes a hardware processor such as a central processing unit (CPU) or a graphics processing unit (GPU) to execute a program (software) stored in a storage unit. In addition, some or all of the functional units of the bumper controller 40 may be realized by hardware (circuitry) such as a large scale integration (LSI), an application specific integrated circuit (ASIC), a field-programmable gate array (FPGA), or may be realized by cooperation between software and hardware.

The target position setting unit 44 sets a target position of the bumper 25. The target position setting unit 44 receives an extension detection signal from the extension detect sensor 28. The target position setting unit 44 sets a position separated by a predetermined distance in the +X direction from a position at which the extension detect sensor 28 has detected the extension of the bumper 25 as the target position of the bumper 25. The target position setting unit 44 outputs the number of pulses of the encoder 38 corresponding to the target position to the bumper extension/contraction controller 42.

Figure 8:
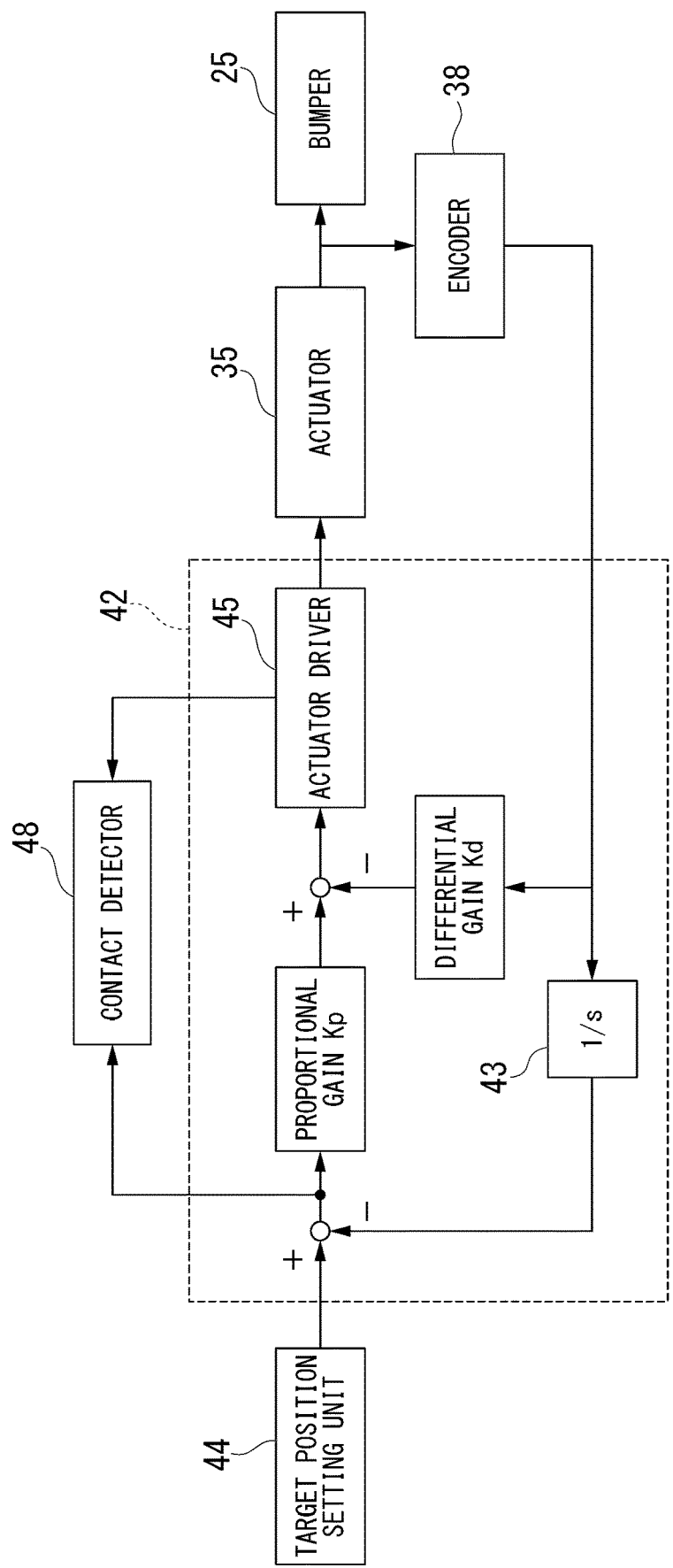
FIG. 8 is a block diagram around a bumper extension/contraction controller.

FIG. 8 is a block diagram around the bumper extension/contraction controller. The bumper extension/contraction controller 42 performs proportional-defferential (PD) control on a position of the bumper 25. The bumper extension/contraction controller 42 receives a target position Xr of the bumper 25 from the target position setting unit 44. The bumper extension/contraction controller 42 receives a pulse corresponding to a rotation angle of the actuator 35 per unit time from the encoder 38. The pulse of the encoder 38 corresponds to an extension/contraction speed V of the bumper 25. The bumper extension/contraction controller 42 integrates the pulse of the encoder 38 with an integrator 43 to calculate a current position X of the bumper 25. The bumper extension/contraction controller 42 performs proportional (P) control by multiplying a positional error between the target position and the current position of the bumper 25 by a proportional gain Kp. The bumper extension/contraction controller 42 performs differential (D) control by multiplying the extension/contraction speed V of the bumper 25 by a differential gain Kd. The bumper extension/contraction controller 42 outputs a command value u for a rotation speed of the actuator 35 to an actuator driver 45. The command value u is expressed by the following equation.

$$u = Kp(Xr-X) - Kd \cdot V$$

The contact detector 48 detects a contact/collision between the bumper 25 and an object. When the bumper 25 collides with an object, a positional error between a target position and a current position of the bumper 25 changes rapidly. The contact detector 48 receives the positional error of the bumper 25 from the bumper extension/contraction controller 42. When a rate of change of the positional error of the bumper 25 exceeds a first predetermined value, the contact detector 48 detects a contact/collision between the bumper 25 and an object. On the other hand, when the positional error of the bumper 25 changes rapidly, a current value of the actuator 35 handled by the actuator driver 45 changes rapidly. The contact detector 48 receives the current value of the actuator 35 from the actuator driver 45. When a rate of change of the current value of the actuator 35 exceeds a second predetermined value, the contact detector 48 detects a contact/collision between the bumper 25 and an object.

Thereby, the bumper 25 functions as a device for detecting physical contact between the automatic guided vehicle 10 and an object. In the first embodiment, an object detection sensor is unnecessary.

As illustrated in FIG. 7, when a contact/collision between the bumper 25 and an object is detected, the contact detector 48 outputs a movement stop command to the movement controller 14. Thereby, the movement controller 14 stops rotation of the wheels 12 by the drive motor 13 and stops movement of the automatic guided vehicle 10.

The bumper controller 40 controls a state of the bumper 25 according to a conveyance state of the cart 1. The bumper controller 40 includes a conveyance state detector 50, an extension setting unit 52, and a servo stiffness setting unit 54.

The conveyance state detector 50 receives a movement speed of the automatic guided vehicle 10 from the movement controller 14 to detect a conveyance speed. The conveyance state detector 50 receives a weight of the cart 1 supported by the lifting mechanism 17 from the lift controller 18 to detect a conveyance weight. When a total weight of the cart 1 is known, the conveyance state detector 50 may receive and detect the total weight of the cart 1. The conveyance state detector 50 outputs the detected conveyance speed and conveyance weight to the extension setting unit 52 and the servo stiffness setting unit 54.

The extension setting unit 52 sets an extension (amount of protrusion) of the bumper 25 according to the conveyance speed and the conveyance weight. The servo stiffness setting unit 54 sets a servo stiffness (the proportional gain Kp and the differential gain Kd) for position control of the bumper 25 according to the conveyance speed and conveyance weight. The larger the servo stiffness, the stronger a force that controls the bumper 25 to a target position. That is, when the bumper 25 and an object collide, the bumper 25 holds on at the target position and an amount of contraction of the bumper 25 becomes small. The extension and the servo stiffness of the bumper 25 are set as shown in Table 1 according to the conveyance speed and the conveyance weight.

TABLE 1

|  |  | Bumper extension | Servo stiffness |
| --- | --- | --- | --- |
| Conveyance speed | Low | Small | Small |
|  | High | Large | Large |
| Conveyance weight | Small | Small | Small |
|  | Large | Large | Large |
| Presence of person |  | Large | Small |

When the conveyance speed is low and the conveyance weight is small, an impact force received by the cart 1 due to a collision between the bumper 25 and an object is relatively small, and a likelihood of the cart 1 colliding with the object also is low. In this case, the extension of the bumper 25 is set to be as small as necessary, and the servo stiffness is set to be small. Since the servo stiffness is set to be small, an impact force received by the bumper 25 due to a collision between the bumper 25 and the object becomes small. Accordingly, a protection performance for the object at the time of contact with an object can be improved.

On the other hand, when the conveyance speed is high and the conveyance weight is large, an impact force received by the cart 1 due to a collision between the bumper 25 and an object becomes relatively large, and a likelihood of the cart 1 colliding with the object also is high. In this case, the extension of the bumper 25 is set to be large and the servo stiffness is set to be large. Since the extension of the bumper 25 is set to be large, a distance between the cart 1 and the object becomes large when the bumper 25 and the object collide with each other. Thereby, a likelihood of the cart 1 colliding with the object decreases. Accordingly, a protection performance for the cart 1 at the time of contact with an object can be improved.

Also, when a person is present around the automatic guided vehicle 10, it is necessary to protect the person at the time of collision between the bumper 25 and the person. In this case, the extension of the bumper 25 is set to be large and the servo stiffness is set to be small. Since the extension of the bumper 25 is set to be large, a distance between the cart 1 and the person becomes large at the time of collision between the bumper 25 and the person. Thereby, a likelihood of the cart 1 colliding with the person decreases. Since the servo stiffness is set to be small, flexibility is imparted to the bumper 25. Thereby, an impact force received by the person due to a collision between the bumper 25 and the person becomes small. As described above, the cart 1 and a person can be protected at the time of collision between the automatic guided vehicle 10 and the person.

The extension setting unit 52 outputs the set extension of the bumper 25 to the target position setting unit 44. The target position setting unit 44 sets the extension of the bumper 25 received from the extension setting unit 52 as the target position of the bumper 25.

The servo stiffness setting unit 54 outputs the set proportional gain Kp and the set differential gain Kd to the bumper extension/contraction controller 42. The bumper extension/contraction controller 42 performs a position control of the bumper 25 using the proportional gain Kp and the differential gain Kd received from the servo stiffness setting unit 54.

As described in detail above, the automatic guided vehicle 10 according to the embodiment includes the vehicle 11, the lift unit 15, the bumper 25, the extension detect sensor 28, and the bumper controller 40. The vehicle 11 is movable at least in the X direction. The lift unit 15 is provided in the vehicle 11 and lifts the cart 1 from below the cart 1. The bumper 25 is provided in the vehicle 11 and is extendable and contractible in the X direction. The extension detect sensor 28 detects that the bumper 25 has extended outward from the cart 1 in the X direction. The bumper controller 40 controls a state of the bumper 25 according to a conveyance state of the cart 1 by the vehicle 11.

The bumper 25 is extendable and contractible in the X direction. The extension detect sensor 28 detects that the bumper 25 has extended outward from the cart 1 in the X direction. Thereby, even when the vehicle 11 is smaller than the cart 1, the bumper 25 extends outward from the cart 1 in the X direction. Accordingly, the cart 1 is protected when the automatic guided vehicle moving in the X direction comes into contact with an object. On the other hand, when the automatic guided vehicle 10 moves alone without accompanying the cart 1, the bumper 25 is contracted close to the vehicle 11. Thereby, contact between the bumper 25 and an object can be inhibited.

The bumper controller 40 controls a state of the bumper 25 according to a conveyance state of the cart 1 by the vehicle 11. Thereby, the cart 1 is appropriately protected according to the conveyance state of the cart 1 at the time of contact between the bumper 25 and an object. Accordingly, the protection performance for the cart 1 can be improved.

The bumper controller 40 includes an extension setting unit 52. The extension setting unit 52 sets an extension of the bumper 25 from the cart 1 according to a weight or a conveyance speed of the cart 1.

Thereby, the extension of the bumper 25 is set to an appropriate size by which the cart 1 can be protected at the time of contact with the object. Accordingly, the protection performance for the cart 1 can be improved.

The bumper controller 40 includes the servo stiffness setting unit 54. The servo stiffness setting unit 54 sets a magnitude of the servo stiffness in positioning control of the bumper 25 according to the weight or the conveyance speed of the cart 1.

Thereby, the servo stiffness of the bumper 25 is set to an appropriate magnitude by which the cart 1 can be protected at the time of contact with an object. Accordingly, the protection performance for the cart 1 can be improved.

The automatic guided vehicle 10 includes the movement controller 14. The movement controller 14 controls movement of the vehicle 11. The bumper controller 40 includes the contact detector 48. The contact detector 48 detects contact between the bumper 25 and an object. The contact detector 48 outputs a movement stop command for the vehicle 11 to the movement controller 14 when contact between the bumper 25 and the object is detected.

Thereby, movement of the automatic guided vehicle 10 is stopped at the time of contact with an object. Accordingly, the protection performance for the cart 1 can be improved.

The contact detector 48 detects contact between the bumper 25 and an object when a rate of change of the positional error between the target position and the current position of the bumper 25 in the X direction exceeds the first predetermined value.

Thereby, the contact between the bumper 25 and an object is detected with high accuracy.

The automatic guided vehicle 10 includes the actuator 35. The actuator 35 extends and contracts the bumper 25 in the X direction. The contact detector 48 detects contact between the bumper 25 and an object when a rate of change of the current value of the actuator 35 exceeds the second predetermined value.

Thereby, the contact between the bumper 25 and an object is detected with high accuracy.

The automatic guided vehicle 10 includes the actuator 35. The actuator 35 extends and contracts the bumper 25 in the X direction. The actuator 35 is connected to the bumper 25 via the timing belt 34.

The timing belt 34 temporarily expands and contracts due to an impact force at the time of contact between the bumper 25 and an object. Thereby, the impact force acting on the actuator 35 is alleviated. Accordingly, a protection performance for the actuator 35 at the time of contact with an object can be improved.

The extension detect sensor 28 is mounted on the bumper 25. When it is detected that the cart 1 is not present in the +Z direction, the extension detect sensor 28 detects that the bumper 25 has extended outward from the cart 1 in the X direction.

Thereby, an extension of the bumper 25 is detected with high accuracy with a simple configuration.

A first modified example of the first embodiment will be described.

Figure 9:
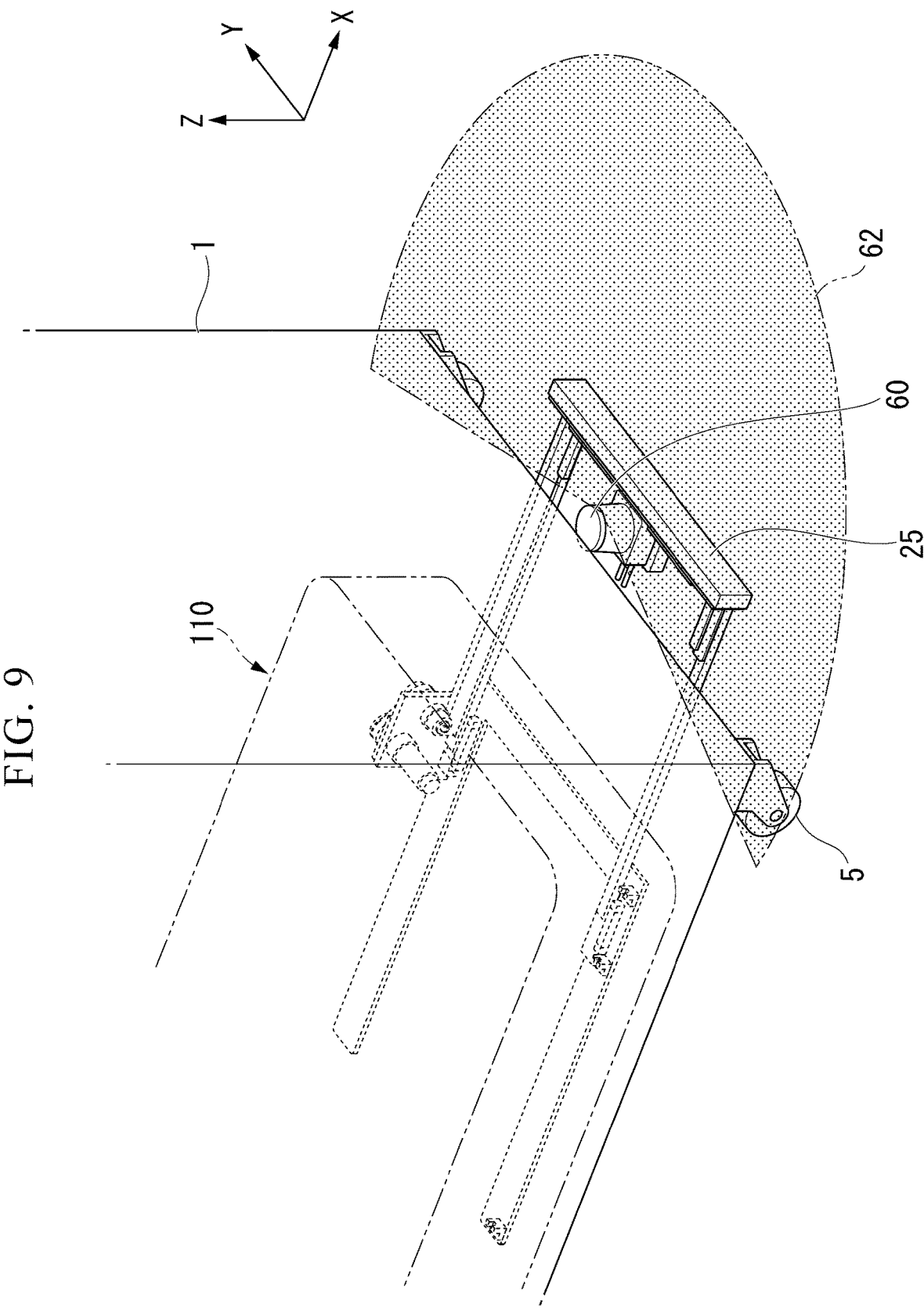
FIG. 9 is an explanatory view of an automatic guided vehicle of a first modified example of the first embodiment.

FIG. 9 is an explanatory view of an automatic guided vehicle according to a first modified example of the first embodiment. An automatic guided vehicle 110 according to the first modified example is different from the first embodiment in that it includes an object detection sensor 60. Description of points of the first modified example which are the same as those in the first embodiment will be omitted.

The object detection sensor 60 may be, for example, a laser range finder (LRF) that performs laser scanning of one plane in a space. The LRF detects a presence of an object based on whether or not irradiated laser light is reflected. The LRF detects a distance to the object with a degree of reflection of the irradiated laser light. The object detection sensor 60 is disposed close to the bumper 25 in the −X direction. The object detection sensor 60 moves in the X direction together with the bumper 25. The object detection sensor 60 is disposed to protrude from the bumper 25 in the +Z direction. A laser scanning plane of the object detection sensor 60 is a plane parallel to a floor surface and having a predetermined height from the floor surface. A laser scanning range 62 of the object detection sensor 60 may be, for example, a range of 270° with the +X direction as a center.

When the caster 5 of the cart 1 is present in the laser scanning range 62, an object that is present on the other side of the caster 5 cannot be detected. Therefore, the object detection sensor 60 is used in a state in which it extends outward from the cart 1 in the +X direction. The target position setting unit 44 (see FIG. 7) of the bumper controller 40 sets a target position of the bumper 25 such that the object detection sensor 60 is disposed in the +X direction from the cart 1. When the object detection sensor 60 is disposed in the +X direction from the cart 1, the caster 5 is disposed in the −X direction from the object detection sensor 60. That is, the caster 5 is not present in the +X direction from the object detection sensor 60. The object detection sensor 60 detects an object present in the +X direction, which is a traveling direction, without being blocked by the caster 5.

The object detection sensor 60 outputs a result of detecting an object by the laser scanning to the movement controller 14 (see FIG. 7). The movement controller 14 moves the automatic guided vehicle 110 to avoid the object on the basis of the detection result received from the object detection sensor 60. When there is no space to move while avoiding the object, the movement controller 14 stops the movement of the automatic guided vehicle 110.

As described above, the automatic guided vehicle 110 of the first modified example includes the object detection sensor 60. The object detection sensor 60 is mounted on the bumper 25 and detects an object present therearound.

When the object detection sensor 60 detects an object, contact between the automatic guided vehicle 110 and the object is avoided. Accordingly, the protection performance for the cart 1 can be improved. The object detection sensor 60 is mounted on the bumper 25. Thereby, the object detection sensor 60 is disposed in the +X direction from the cart 1 together with the bumper 25. Therefore, the object detection sensor 60 can detect an object present in the +X direction, which is the traveling direction, without being blocked by the caster 5 of the cart 1.

Second Embodiment

Figure 10:
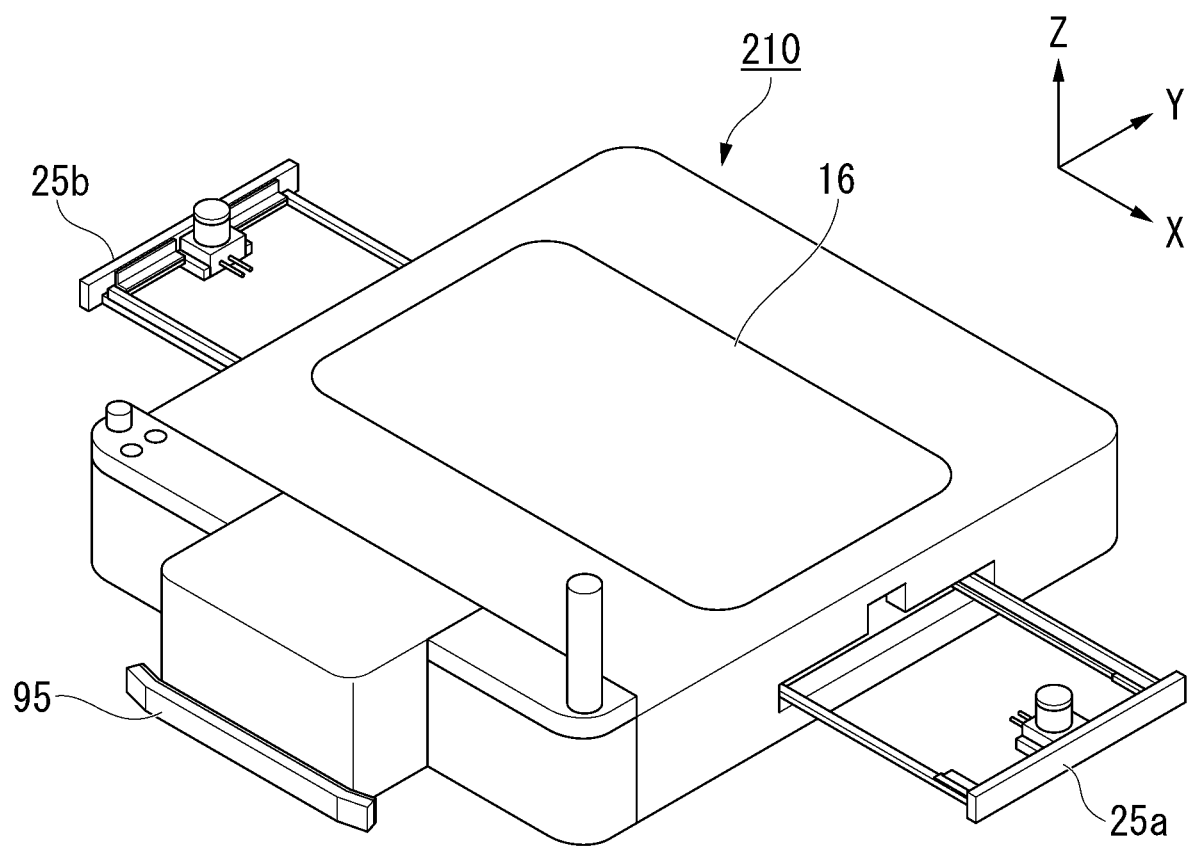
FIG. 10 is a perspective view of an automatic guided vehicle of a second embodiment.

FIG. 10 is a perspective view of an automatic guided vehicle according to a second embodiment. An automatic guided vehicle 210 of the second embodiment is different from the first embodiment in that it includes a first bumper 25a and a second bumper 25b. Description of points of the second embodiment which are the same as those in the first embodiment will be omitted.

Figure 11:
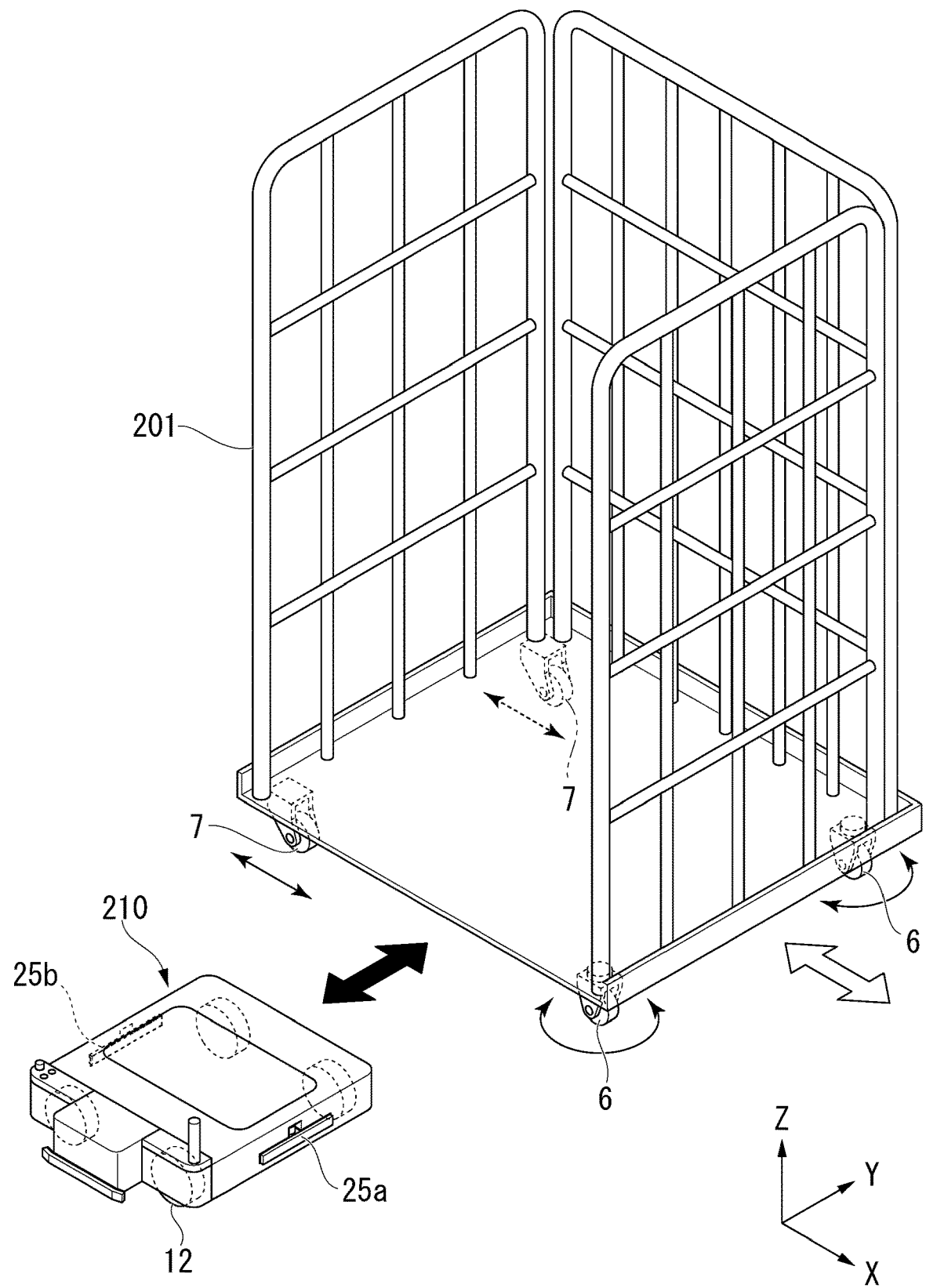
FIG. 11 is an explanatory view of an approach direction with respect to a cart and a conveyance direction of the cart.

FIG. 11 is an explanatory view of an approach direction with respect to a cart and a conveyance direction of the cart. Two wheels in a +X direction of a cart 201 are free wheels (casters) 6 that are rotatable around a Z axis. Two wheels in a −X direction of the cart 201 are fixed wheels 7 that do not rotate around the Z axis. A length in the X direction of the cart 201 is larger than a length in the Y direction thereof. The cart 201 is conveyed with the X direction, which is a longitudinal direction, as a traveling direction. The automatic guided vehicle enters the cart 201 from a Y direction of the cart 201 having a large opening width. That is, the conveyance direction of the cart 201 by the automatic guided vehicle 210 is different from the approach direction of the automatic guided vehicle 210 with respect to the cart 201.

The four wheels 12 of the automatic guided vehicle 210 form, for example, Mecanum wheels. In the Mecanum wheels, each of the wheels 12 has a plurality of rollers on a circumference thereof. The rollers each freely rotate around a rotation axis inclined 45 degrees with respect to an axle of the wheel 12. The Mecanum wheels move a vehicle 11 in all directions by changing a combination of rotation directions or rotation speeds of the four wheels 12. The four wheels 12 may use a normal two-wheel independent drive method (two drive wheels and two driven wheels) or a steering wheel method called an active caster.

As illustrated in FIG. 10, the automatic guided vehicle 210 includes the first bumper 25a and the second bumper 25b as the bumper 25. The first bumper 25a is disposed in the +X direction of the vehicle 11. The first bumper 25a is the same as the bumper 25 of the first embodiment. The second bumper 25b is disposed in the −X direction of the vehicle 11. The second bumper 25b is formed in plane symmetry with the first bumper 25a with a YZ plane passing through a center in the X direction of the vehicle 11 as a symmetry plane. Bumpers 95 that do not extend and contract in the Y direction are mounted on both sides of the automatic guided vehicle 210 in the Y direction.

As illustrated in FIG. 11, the automatic guided vehicle 210 enters below the cart 201 from the −Y direction of the cart 201. The automatic guided vehicle 210 enters below the cart 201 through a space between the free wheels 6 and the fixed wheels 7 of the cart 201. The automatic guided vehicle 210 enters below the cart 201 with the first bumper 25a and the second bumper 25b contracted to the vicinity of the vehicle 11. Since a space between the free wheels 6 and the fixed wheels 7 is wide, the automatic guided vehicle 210 can easily enter below the cart 201.

The automatic guided vehicle 210 raises the lifting plate 16 to support a part of a weight of the cart 201.

The automatic guided vehicle 210 extends the first bumper 25a in the +X direction to be disposed outward from the cart 201 in the +X direction. The automatic guided vehicle 210 extends the second bumper 25b in the −X direction to be disposed outward from the cart 201 in the −X direction. In this state, the automatic guided vehicle 210 moves in the +X direction or −X direction to convey the cart 201. The first bumper 25a protects the cart 201 at the time of contact with an object present in the +X direction from the automatic guided vehicle 210. The second bumper 25b protects the cart 201 at the time of contact with an object present in the −X direction from the automatic guided vehicle 210.

As described above, the automatic guided vehicle 210 according to the second embodiment includes the first bumper 25a and the second bumper 25b. The first bumper 25a is disposed on one side (+X direction) of the vehicle 11 in the X direction. The second bumper 25b is disposed on the other side (−X direction) of the vehicle 11 in the X direction. Thereby, regardless of whether the automatic guided vehicle 210 conveys the cart 201 in the +X direction or the −X direction, the cart 201 is protected at the time of contact with an object. Accordingly, a protection performance for the cart 201 can be improved.

The vehicle 11 is movable in the Y direction in addition to the X direction.

Thereby, the automatic guided vehicle 210 can enter below the cart 201 from the Y direction different from the X direction which is the conveyance direction of the cart 201. Therefore, a degree of freedom in conveyance of the cart 201 improves.

According to at least one embodiment described above, the automatic guided vehicle 10 includes the bumper controller 40. The bumper controller 40 controls a state of the bumper 25 according to a conveyance state of the cart 1 by the vehicle 11. Thereby, a safety performance during conveyance including protection of the cart 1 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic guided vehicle comprising:
   a vehicle which is movable in at least a first direction;
   a lift unit provided in the vehicle and configured to lift an object from below the object;
   a bumper provided in the vehicle and configured to be extendable and contractible in the first direction;
   an extension detector mounted on the bumper and detecting that the bumper has extended outward from the object in the first direction when it is detected that the object is not present above; and
   a bumper controller which controls a state of the bumper according to a conveyance state of the object when transporting the object by the vehicle.

2. The automatic guided vehicle according to claim 1, wherein the bumper controller includes an extension setting unit which sets an extension of the bumper from the object according to a weight or a conveyance speed of the object.

3. The automatic guided vehicle according to claim 1, wherein the bumper controller includes a servo stiffness setting unit which sets a magnitude of a servo stiffness in positioning control of the bumper according to a weight or a conveyance speed of the object.

4. The automatic guided vehicle according to claim 1, further comprising:
   a movement controller which controls movement of the vehicle, wherein
   the bumper controller includes a contact detector which detects contact between the bumper and an object, and
   the contact detector outputs a movement stop command for the vehicle to the movement controller when contact between the bumper and an object is detected.

5. The automatic guided vehicle according to claim 4, wherein the contact detector detects contact between the bumper and an object when a rate of change of a positional error between a target position and a current position of the bumper in the first direction exceeds a first predetermined value.

6. The automatic guided vehicle according to claim 4, further comprising:
   an actuator which extends and contracts the bumper in the first direction, wherein
   the contact detector detects contact between the bumper and an object when a rate of change of a current value of the actuator exceeds a second predetermined value.

7. The automatic guided vehicle according to claim 1, comprising:
   an actuator which extends and contracts the bumper in the first direction, wherein
   the actuator is connected to the bumper via a timing belt.

8. The automatic guided vehicle according to claim 1, further comprising:
   an object detection sensor mounted on the bumper and configured to detect an object present therearound.

9. The automatic guided vehicle according to claim 1, wherein
   the bumper includes:
   a first bumper disposed on one side of the vehicle in the first direction; and
   a second bumper disposed on the other side of the vehicle in the first direction.

10. The automatic guided vehicle according to claim 1, wherein the vehicle is movable also in a second direction intersecting the first direction in addition to the first direction.

11. An automatic guided vehicle comprising:
    a vehicle which is movable in at least a first direction;
    a lift unit provided in the vehicle and configured to lift an object from below the object;
    a bumper provided in the vehicle and configured to be extendable and contractible in the first direction;
    an extension detector which detects that the bumper has extended outward from the object in the first direction; and
    a bumper controller which controls a state of the bumper according to a conveyance state of the object when transporting the object by the vehicle, wherein
    the bumper controller includes a servo stiffness setting unit which sets a magnitude of a servo stiffness in positioning control of the bumper according to a weight or a conveyance speed of the object.

12. The automatic guided vehicle according to claim 11, wherein the bumper controller includes an extension setting unit which sets an extension of the bumper from the object according to a weight or a conveyance speed of the object.

13. The automatic guided vehicle according to claim 11, further comprising:
    a movement controller which controls movement of the vehicle, wherein
    the bumper controller includes a contact detector which detects contact between the bumper and an object, and
    the contact detector outputs a movement stop command for the vehicle to the movement controller when contact between the bumper and an object is detected.

14. The automatic guided vehicle according to claim 13, wherein the contact detector detects contact between the bumper and an object when a rate of change of a positional error between a target position and a current position of the bumper in the first direction exceeds a first predetermined value.

15. The automatic guided vehicle according to claim 13, further comprising:

an actuator which extends and contracts the bumper in the first direction, wherein the contact detector detects contact between the bumper and an object when a rate of change of a current value of the actuator exceeds a second predetermined value.

16. The automatic guided vehicle according to claim 11, comprising:

an actuator which extends and contracts the bumper in the first direction, wherein the actuator is connected to the bumper via a timing belt.

17. The automatic guided vehicle according to claim 11, further comprising:

an object detection sensor mounted on the bumper and configured to detect an object present therearound.

18. The automatic guided vehicle according to claim 11, wherein the bumper includes:

a first bumper disposed on one side of the vehicle in the first direction; and a second bumper disposed on the other side of the vehicle in the first direction.

19. The automatic guided vehicle according to claim 11, wherein the vehicle is movable also in a second direction intersecting the first direction in addition to the first direction.

* * * * *